United States Patent Office 3,148,174
Patented Sept. 8, 1964

3,148,174
POLYMERIZATION OF PYRROLIDONE AND PIPERIDONE EMPLOYING N,N-DISUBSTITUTED UREAS AS CHAIN INITIATORS
Samuel A. Glickman, Easton, and Edgar Shelley Miller, Bethlehem, Pa., assignors to General Aniline & Film Corporation, New York, N.Y., a corporation of Delaware
No Drawing. Filed Apr. 4, 1958, Ser. No. 726,333
7 Claims. (Cl. 260—78)

The present invention relates to the polymerization of 5- and 6-membered lactams, such as pyrrolidone and piperidone.

The polymerization of a lactam, such as pyrrolidone, proceeds via a ring-chain polymerization to give polyamides of 4-aminobutyric acid. Thus:

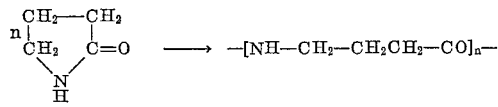

The recurring unit is one which might hypothetically arise in the condensation polymerization of 4-aminobutyric acid. However, early investigators, namely Gabriel (Berichte 32, 1266 (1899)) and Schotten (Berichte 21, 2240 (1880)), observed that 4-aminobutyric acid and 5-aminovaleric acid failed to undergo intermolecular condensation and yielded only the five and six-membered lactams. The first disclosure of such polyamides was that of USP 2,638,463 (W. O. Ney, W. R. Nummy and C. E. Barnes—5/12/53), involving the polymerization of pyrrolidone in the presence of an alkaline polymerization catalyst.

While useful polymers are obtained by the process described in the Ney, Nummy and Barnes patent, No. 2,638,463, considerable difficulty is encountered in obtaining these polymers in satisfactory yields; and, also, in the production of polymers having relatively high molecular weights. Patent No. 2,739,959, of Ney and Crowther, which, in Example I, discloses that only a small yield of low molecular weight polymer may be obtained when an alkaline polymerization catalyst is employed as the sole promoter of the polymerization of pyrrolidone, discloses effecting the alkaline polymerization of the lactam in the presence of a small amount of an acyl compound, as an activator for the alkaline polymerization catalyst; and, preferably, carrying out the polymerization of a lactam while dispersed in an anhydrous hydrocarbon non-solvent therefor, in order to increase the yield and molecular weight of the polymer. The specific activators described in Patent No. 2,739,959, as having the property of increasing the rate of polymerization of lactams having 5- and 6-membered rings, are acyl pyrrolidones, acyl dipyrrolidones, organic peroxides, anhydrous lactones, and alkyl esters. The Ney and Crowther patent discloses the use of these acyl compounds as activators for the alkaline polymerization catalyst.

We have now found that a particular class of N,N-disubstituted ureas are capable of acting as chain initiators in the alkaline catalyzed polymerization of 5- and 6-membered lactams; e.g., of pyrrolidone and piperidone. This particular class of N,N-disubstituted ureas has the role of initiating chain growth, whereby a novel type of polymer is produced. This novel class of N,N-disubstituted ureas actually enters into the polymer chain. This function as a chain intiator is evidenced by the employment of a bromine containing chain initiator precursor, wherein, as more fully described hereinafter, the use of para bromophenylisocyanate resulted in a polymer containing bromine in an amount calculated for on the basis of its complete entry into the polymer as a chain initiator.

The particular class of N,N-disubstituted ureas, which we have found to be useful for initiating the alkaline catalyzed polymerization of pyrrolidone and piperidone, are those having the following general formula:

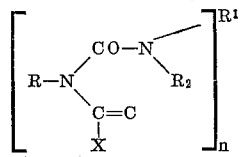

As indicated, the role of this substance is that of initiating chain growth, and, as a result, the group

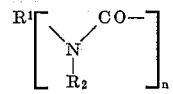

of the N,N-disubstituted ureas enters into the molecule of the polymer, which is produced, so that a novel polymer, of the following general formula is obtained:

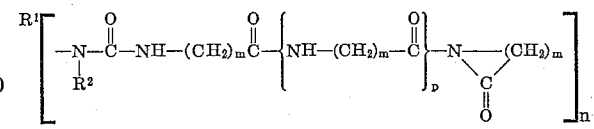

In the foregoing formulae, and in other formulae appearing in this specification, the groups shown have the folowing meanings:

$R^1$ = alkyl, aryl, alkylene, arylene or the residue of a polyfunctional isocyanate
$R^2$ = H, alkyl, or aryl
$m$ = 3 or 4
$n$ = 1 to 4
$p$ = an integer from 1 to 1000
$R$ = alkyl or aryl
$X$ = arylamino, alkylamino, hydrogen, alkyl or aryl or $R+X$, together, may represent an alkylene group to complete a ring (e.g. 2-pyrrolidone, 2-piperidone, or ε-caprolactam)

N,N-disubstituted ureas, of the class described above, which are useful for initiating the alkali catalyzed polymerization of pyrrolidone and piperidone, may readily be prepared by the reaction of a mono- or polyisocyanate, or a mono- or polycarbamyl halide, with a compound containing an —CO—NH-grouping, as indicated by the following equation:

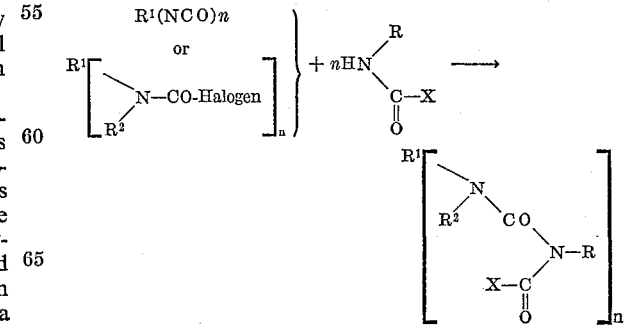

Specific compounds in the above class, which are useful as chain initiators, are shown in the following table:

| R¹ | R | R² | X | R+X | Compound | Literature Reference or Process |
|---|---|---|---|---|---|---|
| Phenyl | H | Phenyl | CH₃ | | N-carbanilino-acetanilide | JACS 71, 3746 (1949). |
| Do | H | ---do--- | NHC₆H₅ | | N,N',N''-triphenylbiuret | Ber. 21, 504 (1888). |
| Do | H | ---do--- | C₆H₅ | | N-carbaniline-benzanilide | Ber. 21, 504 (1888). |
| Do | H | | | —(CH₂)₃— | N-carbanilino-pyrrolidone | Ann. 596, 212. |
| Do | H | | | —(CH₂)₄— | N-carbanilino-piperidone | Ann. 596, 212. |
| Do | H | | | —(CH₂)₅— | N-carbanilino-ε-caprolactam. | JACS 71, 3746 (1949). |
| Do | H | C₂H₅ | CH₃ | | 1-acetyl-1-ethyl-3-phenyl urea. | JACS 71, 3746 (1949). |
| C₄H₉ | H | C₂H₅ | CH₃ | | 1-acetyl-1-ethyl-3-butyl urea. | Butyl isocyanate on N-ethyl acetamide—Wiley, JACS 71, 3746. |
| C₄H₉ | H | Phenyl | H | | 1-formyl-1-phenyl-3-butyl urea. | Do. |
| C₄H₉ | H | | | —(CH₂)₃— | N-(butylcarbamyl)-2-pyrrolidone. | Do. |
| C₂H₅ | C₂H₅ | | | —(CH₂)₃— | N-(Diethylcarbamyl)-2-pyrrolidone. | Diethylcarbamyl chloride and potassiopyrrolidone. |
| C₂H₅ | C₂H₅ | C₆H₅ | CH₃ | | N-(Diethylcarbamyl)-acetanilide. | Diethylcarbamyl chloride and sodioacetanilide. |
| C₂H₅ | C₂H₅ | C₆H₅ | H | | N-(Diethylcarbamyl) formanilide. | Diethylcarbamyl chloride and sodioformanilide. |
| CH₃ | C₆H₅ | C₆H₅ | CH₃ | | 1-acetyl-1-phenyl-3-methyl 3-phenyl urea. | N-methyl, N-phenyl carbamyl chloride and acetanilide. |
| [phenyl-] | H | | | —(CH₂)₃— | N-Bis-(m-phenylene-dicarbamyl)-2-pyrrolidone (M.P. 190°). | W. Reppe—Ann. 596, p. 212. |
| —(CH₂)₆— | H | | | —(CH₂)₃— | N-Bis-(hexamethylene dicarbamyl)-2-pyrrolidone (M.P. 95°). | W. Reppe—Ann. 596, 212. |
| C₄H₉— | H | C₄H₉ | —NHC₄H₉ | | 1-butylcarbamyl-1,3-dibutyl urea. | Butylisocyanate and 1, 3-dibutyl urea—Wiley, JACS 71, 3746 (1949). |

It has been found that the N,N-disubstituted ureas, which are effective for chain initiating the alkali catalyzed polymerization of pyrrolidone and piperidone, must be those of the general formula indicated above.

This specificity of substitution, requiring an N,N-disubstituted urea of the class indicated, may be shown by a consideration of the employ of other compounds. Polymerizations attempted using C₆H₅NHCONHC₆H₅ (1,3-diphenylurea), as a chain initiator, were unsuccessful, whereas the substitution of a phenylcarbamyl radical to give N,N',N''-triphenylbiuret, led to a material capable of chain initiating the polymerization. In a similar fashion, C₆H₅NHCOCH₃ (acetanilide) failed as a chain initiator; and whereas the phenylcarbamyl substitution product, N-carbanilinoacetanilide, demonstrated chain initiator activity.

The attempted polymerization of highly purified pyrrolidone, by means of an alkaline catalyst alone fails to give anything more than traces of polymer (in the order of 1% or less). The use in small amounts of a phenylcarbamyl derivative,

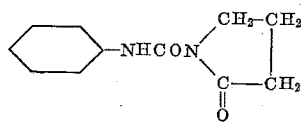

named N-carbanilino-2-pyrrolidone, causes the polymerization to ensue. This, in addition to the cases reported above, demonstrates the requirement as to the specific nature of the substituted ureas which show chain initiator activity.

Whereas the above designation of certain N,N-disubstituted ureas as chain initiators has been made, it has been shown that substances (herein called chain initiator precursors) capable of forming in situ substituted ureas related to pyrrolidone may act to initiate the polymerization of alkaline pyrrolidone solutions. Thus, the class of organic isocyanates, which react with pyrrolidone, or piperidone, to form carbamyl derivatives demonstrates chain initiator activity. For example, phenyl isocyanate, reacting with pyrrolidone to form in situ N-carbanilino-2-pyrrolidone, acts as a chain initiator. The use of carbamyl halides results in a successful polymerization of pyrrolidone, since there is produced in situ the carbamyl derivative of the class of an N,N'-disubstituted urea.

Examples of carbamyl halides include N,N-dimethyl carbamyl chloride, p-phenylene dicarbamyl chloride, and N-methyl-N-phenyl carbamyl chloride.

The use of polyisocyanates as chain initiators has made possible the preparation of high molecular weight polypyrrolidone, since each cyanate function serves to initiate a single chain. Thus, in the use of diphenylmethane-4,4'-diisocyanate, the polymer chains are linked through a group consisting of

In a similar fashion, other polyisocyanates may be employed, such as 2,4-tolylenediisocyanate, 2,6-tolylenediisocyanate, 3,3'-bitolylene-4,4'-diisocyanate, triphenylmethane-4,4',4'''-triisocyanate, 4,4'-dimethyl-diphenylmethane, 2,2',5,5'-tetraisocyanate, ethylene bis 2,4-benzene-diisocyanate, polystyrene polyisocyanate and the like; also polyaryl polyisocyanate, described as having the following formula:

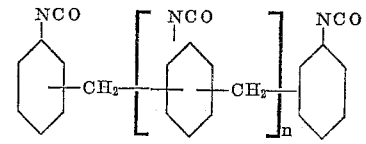

wherein $n$ is a small integer. Products of this type, where $n$ has an average value of 1, are commercially available; however, for the purposes of the present invention, products with higher values of $n$ would also be of value.

It had been noted that the molecular weight of the polymer and its yield depended on the molar quantities of the chain initiator employed. In the employ of the polyfunctional diisocyanates above, the use of a given molar quantity resulted in a higher molecular weight than that achieved with the same molar quantity of a monofunctional isocyanate, such as phenyl isocyanate. The advantage is considerable where one is seeking material of a high molecular weight.

The general conditions and factors utilized for polymerizing 5- and 6-membered lactams, pursuant to the present invention, may be those mentioned in U.S. Patent No. 2,739,959, except for the presence of an N,N-disubstituted urea, as the chain initiator for the polymerization, in place of the activators specified in that patent. In general, the method of effecting polymerization of 5- and 6-membered ring lactams, by the process of the present invention, is as follows:

Initially, there is the preparation of an anhydrous solution of the alkali pyrrolidone in pyrrolidone. The alkali pyrrolidone usually employed is sodio or potassio pyrrolidone, and may be obtained via the reaction of pyrrolidone with sodium and potassium metal or the respective hydroxides. In the latter case, it is essential to remove the water formed thereby as rapidly as possible. The concentration of the alkali pyrrolidone employed in many instances may vary from 0.5 to 5.0 mole percent, (percentages based on pyrrolidone), and may range from 0.1 to 10.0 mole percent. In a series of experiments, optimum yields were obtained with about 1.25 mole percent of alkali pyrrolidone. The role of the alkali pyrrolidone is that of a catalyst and serves as a source of pyrrolidone anions.

The amount of chain initiators employed in many instances may vary from 0.1 to 10.0 mole percent (percentage based on pyrrolidone). The concentration of chain initiator chosen, will depend on the conversion desired, and the molecular weight sought. The rate of the polymerization will depend, to a large extent, on the molar amount of chain initiator employed, the higher rates obtained by the use of greater amounts of chain initiator. The polymerizations may be chain initiated at temperatures from 25° C. to 65° C. and are accompanied by a mild exothermic reaction.

In a bulk or mass polymerization, the addition of the chain initiator is followed by a thickening of the solution and gradual solidification of the mixture. The toughness of the cake will, obviously, depend on the extent of the conversion and will be dependent on the times involved and amounts of chain initiators used.

The polymerization employing the foregoing chain initiators may be conducted on a dispersion of pyrrolidone, and the alkali pyrrolidone in a non-solvent for the pyrrolidone. Applicable non-solvents fall in the class of saturated and olefinic aliphatic alicyclic hydrocarbons, i.e., pentane, hexane, heptane, cyclohexane, pentene, cyclohexene, etc. The amount of non-solvent frequently employed is 1 to 3 parts of non-solvent per unit weight of pyrrolidone, but is subject to wide variation. The physical state of the resulting polymer obtained, via a dispersion polymerization may vary from a thick curd to a fine powder, depending on conversion desired, ratio of non-solvent and type as well as rate of agitation.

For the purposes of comparison, there are given below, as Examples A and B, illustrations of the prior art polymerization of highly purified pyrrolidone, from the same batch, and purified in the same manner as the pyrrolidone used in the examples appearing later in the specification of the process of the present invention:

*Example A*

A 500 cc. glass flask was charged with 100.0 grams (1.18 moles) of highly purified pyrrolidone. There is added 1.0 grams of potassium hydroxide flakes of 83% assay, the system immediately placed under a reduced pressure of 10 mm. and rapidly heated to the reflux point of 120 to 125° C. The vapors were condensed in a vertical reflux condenser, maintained at a jacket temperature of 75° C., thus permitting the return of the pyrrolidone and, at the same time, effecting the removal of water. After one hour at the reflux point, the reaction mixture in the still pot was cooled and the clear, colorless solution of potassio pyrrolidone in pyrrolidone allowed to stand for 24 hours at room temperature to the exclusion of atmospheric moisture and carbon dioxide. During the 24-hour period, the mixture became turbid and a scant amount of solid was deposited. The mixture was treated with 400 grams of distilled water, the solid filtered and thoroughly washed with water. The dried polymer weighed 0.6 gram, representing a conversion of 0.6%. The material was of low molecular weight, as indicated by the relative viscosity of a 1% solution in meta cresol.

*Example B*

This example is an illustration of an alternate polymerization of highly purified pyrrolidone, and closely follows Example 1, of U.S. Patent No. 2,739,959, which is also an illustration of prior art polymerization of pyrrolidone.

A 500 cc. glass flask, equipped for vacuum distillation, was charged with 120.0 grams of highly purified pyrrolidone. There is added 1.0 grams of potassium hydroxide flakes of 83% assay. The system was immediately placed under a reduced pressure of 1.0 mm. and rapidly heated to effect the distillation at 90 to 100° C. of 20 grams of pyrrolidone and water. The resulting clear, colorless solution in the still pot constitutes a solution of potassio pyrrolidone in pyrrolidone. The solution was allowed to cool to room temperature and stand for 24 hours to the exclusion of atmospheric moisture and carbon dioxide. During this 24-hour period the mixture became turbid and a scant amount of solid was deposited. The contents was treated with 400 grams of distilled water, the solid filtered and thoroughly washed with water. The dried polymer weighed 0.5 gram, representing a conversion of 0.5%. The material was of low molecular weight as indicated by the relative viscosity of a 1% solution in meta cresol.

The details of the present invention will be apparent to those skilled in the art, from the following specific examples, of preferred methods of practicing the same:

*Example I*

A 500 cc. glass flask was charged with 100 grams (1.18 moles) of highly purified pyrrolidone. There was then added 1.0 grams of potassium hydroxide flakes of 83% assay, and the mixture immediately placed under a reduced pressure of 10 mm. and rapidly heated to the reflux point of 120-125° C. The vapors were condensed in a vertical reflux condenser, maintained at a jacket temperature of 75° C., thus permitting the return of the pyrrolidone, and, at the same time, effecting the removal of water. After 1 hour, at the reflux point, there was obtained a clear, colorless solution of potassio pyrrolidone in pyrrolidone. This was allowed to cool to 50° C., and there was then added 1.5 grams (0.006 mole) of N-carbanilino-acetanilide [$C_6H_5N(CONHC_6H_5)COCH_3$—M.P. 103–105° C. prepared according to the procedure of P. E. Wiley, J.A.C.S. 71, 3746 (1949)]. The molar concentration of the chain initiator is 0.5 mole percent based on the pyrrolidone. In a matter of minutes the solution became turbid and, in the course of 1 hour, was a solid. The mixture, to the exclusion of atmospheric moisture and carbon dioxide, was allowed to stand for 24 hours. To remove pyrrolidone, the solid was suspended in 400 grams of water, filtered and washed thoroughly with water. The dry polymer weighed 22.6 grams, representing a conversion of 22.6%. The relative viscosity of a 1% solution in meta cresol was 1.68 and the material possessed an M.P. of 254°–256° C. The thus obtained polymer had the following formula:

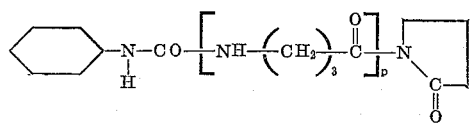

As illustrative of the specificity of substitution, required in the N,N-disubstituted urea, used as initiator, the foregoing example was repeated using 0.81 gram (0.006 mole) of acetanilide, as the chain initiator, in place of N-carbanilinoacetanilide; i.e., for the carbanilino group on the amide nitrogen of the acetanilide, there was substituted hydrogen. When this was done, the contents of the flask, at the conclusion of the experiment, contained a scant amount of solid, which was recovered by diluting with water, recovering the solid by filtration, and thoroughly washing it. There was thus obtained 0.5 gram of dried polymer of very low viscosity, and representing a conversion of 0.5%.

Example II

A solution of potassio pyrrolidone in 100 grams (1.18 moles) of pyrrolidone was prepared as described in Example I. To the above, at 50° C., was added 2.0 grams (0.006 mole) of N,N′,N″-tri-phenylbiuret, prepared according to the procedure of B. Kuhn and E. Henschel, Ber. 21, 504 (1888). The molar concentration of the chain initiator is 0.5 mole percent, based on the pyrrolidone. After a period of 24 hours, the contents were treated with water, the solid filtered and thoroughly washed with water. The dry polymer was obtained in a conversion of 20.6%. The relative viscosity of a 1% solution in meta cresol was 1.61 and posssesed an M.P. of 254–256° C. The thus obtained product had the following formula:

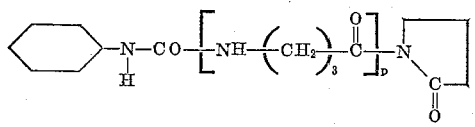

As illustrative of the specificity of substitution required in the chain initiator, the foregoing experiment was repeated, except that, in place of a 2.0 grams of N,N′,N″-tri-phenylbiuret, there was used 1.3 grams (0.006 mole) of 1,3-diphenyl urea; i.e., the carbanilino group on the amide nitrogen of the N,N′,N″-tri-phenylbiuret was substituted by hydrogen. When this was done, and the product worked up in the same manner, the amount of dried polymer obtained represented a 0.5% conversion of low molecular weight material.

Example III

A solution of potassio pyrrolidone in 100 grams (1.18 moles) of pyrrolidone was prepared as described in Example I. To the above, at 50° C. was added 1.2 grams (0.006 moles) of N-carbanilinopyrrolidone—M.P. 98° C. [prepared by the reaction of phenyl isocyanate and 2-pyrrolidone, W. Reppe, Analen 596, 212 (1955)]. The molar concentration of the chain initiator is 0.5 mole percent, based on the pyrrolidone. In a matter of minutes, the solution became turbid and, in the course of 2 hours, was a gel-like mass. The mixture was allowed to stand for 24 hours, precautions being taken to avoid moisture and carbon dioxide. The contents were suspended in water, solid filtered and thoroughly washed with water. The dry polymer weighed 36 grams for a conversion of 36%. The M.P. was 254–256° C. and the polymer possessed a relatively viscosity of 1.94 as a 1% solution in meta cresol. This polymer had the formula:

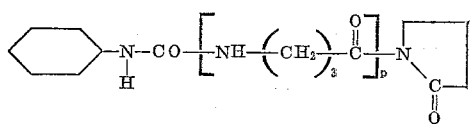

In the foregoing examples, I to III, inclusive, the N,N-disubstituted urea, employed as the chain initiator was pre-formed, and added to the solution of potassio pyrrolidone in pyrrolidone. However, as previously indicated, an N,N-disubstituted urea, which is used as chain initiator, may be formed, in situ, by adding an isocyanate, or carbamyl halide, to the solution of potassio pyrroldone in pyrrolidone. This method of operation is described in the following specific examples:

Example IV

A solution of potassio pyrrolidone was prepared from 100 grams (1.18 moles) of pyrrolidone and 1.5 grams of potassium hydroxide flakes of 84% assay, as described in Example I. To the clear solution, at 35° C., was added, with stirring, 1.6 grams (0.0133 moles) of phenyl isocyanate, corresponding to 1.13 mole percent. The solution clouded immediately, and, within 5 minutes, was a soft gel. In the course of 10 minutes, it was a tough white gel, and the temperature had risen to 50° C. The material was allowed to stand over-night to the exclusion of moisture and carbon dioxide. The hard mass was dissolved slowly in 400 cc. of 6 N-hydrochloric acid and the polymer precipitated by the addition of aqueous ammonia. The thoroughly washed, dry polymer weighed 74.6 grams (a conversion of 74.6%). The relative viscosity of a 1% solution of the polymer in meta cresol was 1.6. The M.P. was 254–256° C. The thus obtained polymer had the same general formula of that of Example III.

Example V

The procedure of Example IV was followed, except that the amount of phenyl isocyanate employed as chain initiator was 0.5 mole percent, based on the pyrrolidone. The conversion to polymer, after a 24-hour period, was 39.8%. The polyamide (which had the same general formula as that of Example III) had an M.P. of 254–256° C. and possessed a relatively viscosity of 1.56 for a 1% solution in meta cresol.

This example describes the manner in which the conversion to polymer is related to the molar ratios of chain initiator employed.

Example VI

The following example, utilizing p-bromophenyl isocyanate as a chain initiator, indicates clearly the chain-initiating role of the chain initiator in the polymerization. The bromine analysis permits a calculation which shows virtually complete entry into the polymer chain, presumably as the initiating molecule.

A solution of potassio pyrrolidone in 50 grams (0.59 mole) of pyrrolidone was prepared as described in Example I. To the above, at 50° C., was added 1.1 grams (0.006 mole) p-bromophenyl isocyanate. The molar percentage of the chain initiator was 1.0 mole percent. The solution thickened gradually, and, in the course of 24 hours, was a solid mass. The white solid was dissolved in 150 cc. of 90% formic acid, precipitated by the addition of aqueous ammonia and thoroughly washed with water and methanol. The dry polymer weighed 40.4 grams for a conversion of 80.8%, and the relative viscosity as a 1% solution in m-cresol was 2.60. The bromine analysis on the polymer was 1.08 and 1.09%, conducted on a semi-micro scale. Calculation shows that 98.5% of the bromine employed as p-bromophenyl isocyanate has entered the polymer chain, presumably, in the role of a chain initiator. The thus obtained polymer had the following formula:

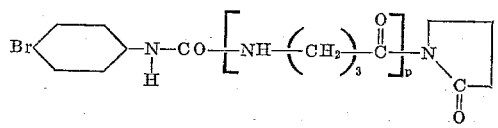

Example VII

The following illustrates the use of hexane in a nonsolvent suspension polymerization of pyrrolidone, employing an organic isocyanate as a chain initiator-precursor.

A suitably equipped glass vessel was charged with a solution of potassio pyrrolidone in 50 grams (0.59 mole) of pyrrolidone, as prepared in Example I. There was then added 100 grams of anyhdrous hexane, which had been stored over sodium wire, and the mixture thoroughly agitated. At 25° C., with stirring, a 0.36 gram (0.003 mole) portion of phenyl isocyanate was added. In the course of two hours, the nature of the suspended material changed from a thick liquid to a soft solid. The solid was then suspended in 100 ml. of methanol and stirred for several hours to aid in the removal of unreacted pyrrolidone. The polymer was filtered, thoroughly washed with water, and dried. The weight of polyamide obtained was 20 g. for a conversion of 40%. The M.P. was 254–256° C. and a 1% solution in meta cresol had a relative viscosity of 2.19. The thus obtained polymer had the same formula as that produced in Example III.

*Example VIII*

The following example illustrates the use of a polyfunctional chain initiator-precursor, in this case represented by 2,4-tolylene diisocyanate. The use of this difunctional agent leads to polymers with a higher molecular weight at a given conversion than the corresponding polymers obtained through the use of a monofunctional chain initiator at the same conversion.

A solution of potassio pyrrolidone in 50 grams of pyrrolidone was prepared as described in Example I. To this solution at 50° C. was added 0.25 g. (0.0015 mole) of 2,4-tolylenediisocyanate. The molar concentration is 0.25 mole percent, based on pyrrolidone. In a matter of minutes, the solution formed a gel, and, in the course of 20 minutes, was solidified to a tough mass. The material was allowed to stand for 24 hours, atmospheric moisture and carbon dioxide being excluded. The hard mass was then dissolved in 150 cc. of 90% formic acid and the polymer precipitated by neutralization with aqueous sodium hydroxide. The thoroughly washed solid was dried to give 28.4 grams (56.6% conversion) of polyamide, having an M.P. of 254–256° C. and a relative viscosity of a 1% solution in meta cresol of 2.3. The thus obtained polymer had the following formula:

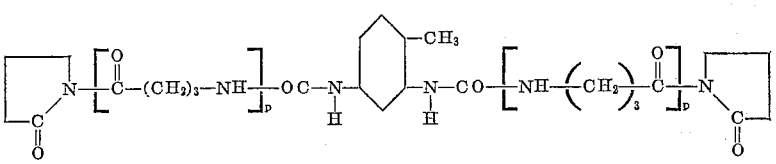

*Example IX*

This example describes the use of heptane in a nonsolvent suspension polymerization of pyrrolidone, employing a polyfunctional chain initiator-precursor represented by 2,4-tolylene diisocyanate.

A solution of potassio pyrrolidone in 1000 g. (11.8 moles) of pyrrolidone was prepared by the procedure of Example I. There was then added 1000 g. of anhydrous n-heptane. To the above thoroughly agitated mixture, at 40° C., was added 3.0 grams (0.018 mole) of 2,4-tolylene diisocyanate. The molar concentration of chain initiator is 0.15 mole percent based on pyrrolidone. The suspended pyrrolidone thickened and whitened in the next several minutes, the temperature reaching 45° C. The mixture was stirred for 2 days, at the end of which time the product was a thick suspension of white powdery solid in heptane. The heptane was decanted and the solid stirred for two hours with methanol. The solid was filtered, suspended in water, thoroughly washed with water and dried. A yield of 454 grams was obtained, amounting to a 45.4% conversion. The polymer melted at 254–256° C. and gave a relative viscosity of 3.18, as a 1% solution in m-cresol.

The above illustrates the effect of a polyfunctional chain initiator in achieving material of high molecular weight, employing but small amounts of chain initiator. The thus obtained polymer had the same formula as that produced in Example VIII.

*Example X*

A solution of potassio pyrrolidone in 50 grams (0.59 mole) of pyrrolidone was prepared, as described in Example I. To this solution, at 50° C., add 0.33 gram (0.15 mole percent concentration) of triphenylmethane-4,4′,4″-triisocyanate. The solution soon gels, and solidifies to a tough mass in a short time. After allowing the material to stand for 24 hours, atmospheric moisture and carbon dioxide being excluded; the thus obtained tough mass is dissolved in about 150 cc. of 90% formic acid, and the polymer precipitated by neutralization with aqueous sodium hydroxide. After being thoroughly washed and dried, the dried polymer, which viscosity measurements indicate is of quite high molecular weight, is recovered in about 50% conversion. The high molecular weight and high viscosity may be attributed to the chain initiation from three active centers, as indicated by the following general formula for the product:

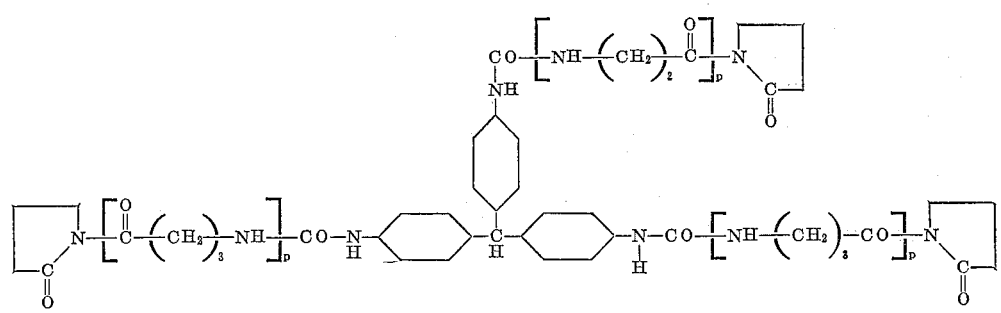

It will be apparent that the procedure of Examples IX and X are generally applicable to the production of polymers from polypyrrolidone employing a poly-functional initiator, having several active groups. Thus, by using ethylene-bis-2,4-benzenediisocyanate in about 0.15 mole percent concentration, which can be prepared by the nitration of 1,2-diphenylethane, followed by a reduction of the amino groups, and reaction with phosgene, a polyamide of high molecular weight may be obtained in good yield, having the following general formula:

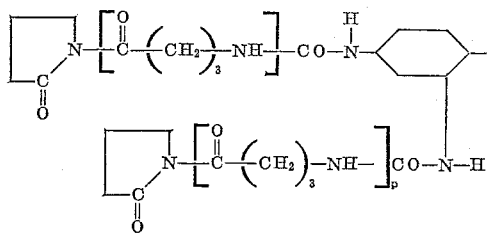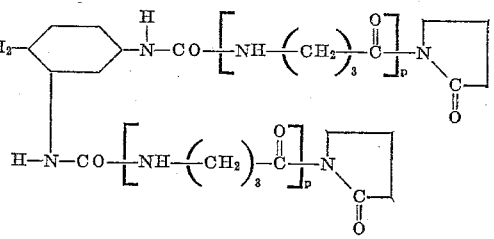

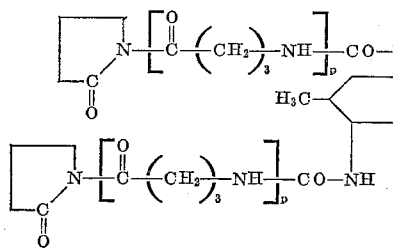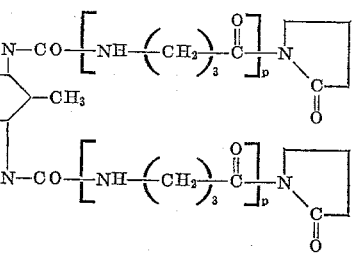

Similarly, a polymer of high molecular weight, also arising in four directions from the central point may be obtained by employing 4,4′-dimethyldiphenylmethane-2, 2′,5,5′-tetraisocyanate as polymerization initiator. The polymer obtained in such case has the following general formula:

where "A" equals N-pyrrolidonyl, N-piperidonyl or —NH—$CH_2CH_2CH_2COY$ radical; where $m$ equals 3 or 4; "Y" represents oxymetal, hydroxyl, alkoxy, aryloxy, aralkoxy, oxyammonium, oxyaminium, amino, alkylamino, arylamino.

As samples of specific reagents, which may be employed to terminate the polymer chains, otherwise than in a pyrrolidonyl or piperidonyl radical, may be mentioned

Example XI

Charge a 500 cc. glass flask with 99.0 g. (1.0 mole) of highly purified piperidone. Add 1.0 gram of potassium hydroxide of 83% assay; place the system immediately under a reduced pressure of 5 mm. and rapidly heat to the reflux point (120–125° C.). Condense the vapors in a vertical reflux condenser, maintained at a jacket temperature of 75° C., thus permitting the return of piperidone and, at the same time, effecting the removal of water. After one hour, at the reflux point, cool the reaction mixture in the still pot to 50° C. and treat the clear, colorless solution with 1.2 grams (0.01 mole) of phenyl isocyanate, corresponding to 1.0 mole percent. Allow the solution, which immediately becomes turbid, and within ten minutes, a soft mass of white solid, to stand 24 hours, to the exclusion of moisture and carbon dioxide. Then dissolve the hard mass in 400 grams of 90% formic acid by stirring over a 24 hour period. Pour the viscous solution onto 2000 grams of water and thoroughly wash the precipitated white solid, filter, and dry in a vacuum oven at 80° C. The polyamide thus obtained is believed to possess the formula:

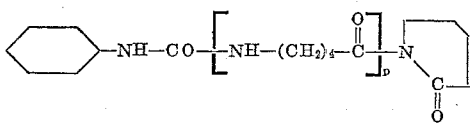

While an N-pyrrolidonyl, or N-piperidonyl group appears to be the usual chain-terminating group of the polymers obtained, pursuant to the present invention, it will be apparent to those skilled in the art, that the polymer chains may be otherwise terminated, for instance, by the formation of the acids and the metal and ammonium salts thereof, as well as esters and amides, which may arise by reaction of the active polymer intermediate with alkaline compounds, hydroxyl-containing compounds, or amines. Therefore, the polymers obtained, pursuant to the present invention, may, generically, be represented by the following general formula:

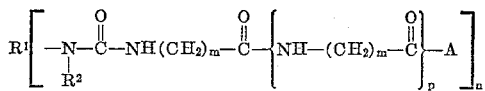

water, sodium hydroxide, sodium methylate, methanol, ethanol, phenol, ammonia, ethylamine, aniline, diethanolamine. Reaction of the free polymer acid with alkaline agents such as metal hydroxides and amines gives the respective salts. The various terminations proceed through scission of the terminal pyrrolidone ring, or one of the polyamide linkages, particularly the linkage between the terminal pyrrolidonyl linkage and the carbonyl grouping linked thereto. Termination of the polymer chain by means of an ester, such as

—NH—$CH_2CH_2CH_2COOCH_3$ may be accomplished by treatment of the polymer intermediate with methanol. In a similar fashion, treatment of the polymer obtained in the hexane suspension polymerization with an amine, such as aniline, yields an amide terminated function, of the type

—NH—$CH_2CH_2CH_2CONHC_6H_5$

Hydrolysis of the terminal ring may be accomplished by treating the alkaline containing white solid, obtained in the polymerization, with water at 75–80° C. for one hour. The resulting product is terminated by a

—NH—$CH_2CH_2CH_2COOK$ group. Conversion to the free acid, and, consequently to the other metal and ammonium salts, is accomplished by acidification and respective action of alkalizing agents.

The products of the present invention are, as indicated, polyamides of the nylon-4 type from pyrollidone, or nylon-5 from piperidone; and, as such, are useful in the arts as in many applications of nylon. In particular, the products of the present invention, particularly, those of relatively high molecular weight, e.g., products which have a relative viscosity of about 2.5 or higher, as a 1% solution in the m-cresol, are useful for the production of fibers or textile and other uses—e.g., as insulating blankets, etc. Fibers have been successfully produced from products of the present invention, by drawing from a melt and spinning from solutions, such as solution in formic acid, followed by evaporation of solvent. Useful films, having a wide variety of applications, may also be produced from the products of the present invention by melt-extrusion, by film-casting from solutions, such as a formic acid solution, glycolic or lactic acid solution, followed by removal of the solvent. Such films are useful in numerous application, including electrical applications, as an insulator; as a base for industrial tapes; as a lining material or glass replacement, and in a variety of special packaging applications. The products of the present invention may also be used in plastic compression molding and extrusion molding applications, where their crystaline nature, sharp melting point and marked fluidity, in the molten state, results in faithful reproduction of the mold. Molded products, for use as containers, may be produced from powders obtained pursuant to the present invention; and, also, many mechanical and other engineering parts and materials, such as gears, cams, bearings, and similar machine components may be produced from them. In the electrical arts, the products of the present invention are useful as a coating on wire, etc., as an insulation, and for the production of certain mechanical, electrical parts, such as insulating bushings, fuse holders, and the like. The products are also of interest in the coating arts as finishes for textiles, paper and similar fibrous materials, and for use as special adhesives and other coatings.

It should also be understood that the products of the present invention may be compounded in many applications with other synthetic plastic materials, plasticizers and fillers. Among the plasticizers, which have been found to be compatible with the products of the present invention, may be mentioned, o- and p-toluenesulfonamide, N-ethyl o- and p-toluenesulfonamide, ethylene carbonate and propylene carbonate.

While the production of polymers of 2-pyrrolidone and 2-piperidone has specifically been described in the foregoing examples it will be apparent that the process of the present invention may be employed for the production of polymers of homologues of 2-pyrrolidone and 2-piperidone which contain a lower alkyl (1–4 carbon atoms) substituent on the carbon atoms in the ring. Such alkyl substituted pyrrolidones and piperidones which have been found to be most readily polymerized by the process of this invention are those in which certain alkyl substituents in 3 and 4 positions such as 3-methyl-2-pyrrolidone, 4-methyl-2-pyrrolidone, 4-ethyl-2-pyrrolidone, 3,3-dimethyl-2-pyrrolidone, 4,4-dimethyl-2-pyrrolidone, 3-methyl-2-piperidone, and 3-ethyl-2-piperidone. The alkyl substituted pyrrolidones and piperidones may be represented by the general formula

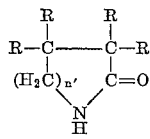

or

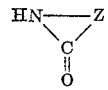

wherein Z represents

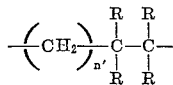

where $n'$ is one of the integers 1 and 2 and the R's represent a member of the group consisting of H and lower alkyl groups of 1 to 4 carbon atoms. The polymeric unit of the polymers produced on polymerizing them in accordance with the present invention may thus be represented by the general formula

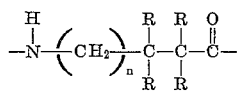

or

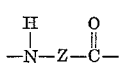

We claim:
1. In the process of polymerizing the lactams of the formula:

wherein Z is

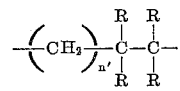

wherein $n'$ is an integer from 1 to 2 and R is a member of the group consisting of H and lower alkyl under essentially anhydrous conditions and in the presence of a minor amount up to about 10 mole percent based on said lactam of an alkali metal lactam as the polymerization catalyst; the improvement comprises carrying out said polymerization in the presence of a minor amount up to about 10 mole percent based on said lactam of an N,N-disubstituted urea of the formula:

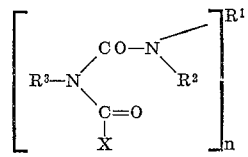

wherein $R^1$ is a hydrocarbon radical of valence $n$; $R^2$ is a member of the group consisting of H, alkyl, and aryl; $R^3$ is a member of the group consisting of alkyl, aryl, and bivalent alkylene radical joined to bivalent X; X is a member of the group consisting of arylamino, alkylamino, hydrogen, alkyl and aryl, and bivalent alkylene radical joined to bivalent $R^3$; $R^3 + X$, together, when bivalent form with the N and C atoms to which they are respectively attached an alkylene radical of the formula Z as defined above; and $n$ is an integer from 1 to 4.

2. A process as defined in claim 1 wherein the polymerization chain initiator specified is formed, in situ, in the solution of alkali pyrrolidone in pyrrolidone by adding thereto an isocyanate.

3. A process as defined in claim 1, wherein the polymerization chain initiator specified is formed, in situ, in the solution of alkali pyrrolidone in pyrrolidone by adding thereto phenylisocyanate.

4. A process as defined in claim 1, wherein the polymerization chain initiator specified is formed, in situ, in the solution of alkali pyrrolidone in pyrrolidone by adding thereto tolylenediisocyanate.

5. In the process of polymerizing lactams of the formula:

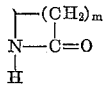

wherein $m$ is an integer from 3 to 4, under essentially anhydrous conditions and in the presence of a minor amount up to about 10 mole percent based on said lactam of an alkali metal lactam as the polymerization catalyst; the improvement which comprises carrying out said polymerization in the presence of a minor amount up to about 10 mole percent based on said lactam of an N,N-disubstituted urea of the formula:

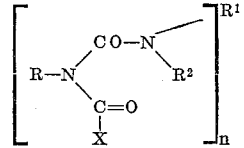

wherein $R^1$ is a hydrocarbon radical of valence $n$; $R^2$ is a member of the group consisting of H, alkyl, and aryl; R is a member of the group consisting of alkyl, aryl and bivalent alkylene radicals joined to bivalent X; X is a member of the group consisting of arylamino, alkylamino, hydrogen, alkyl and aryl, and bivalent alkylene radical joined to bivalent R; R+X together, when bivalent, form with the N and C atoms to which they are respectively attached an alkylene radical of the formula $-(CH_2)_m-$; and $n$ is an integer from 1 to 4.

6. The process as defined in claim 5 wherein the polymerization chain initiator specified has the following formula:

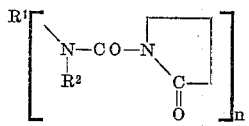

wherein $R^1$ is a hydrocarbon radical of valence $n$; $R^2$ is a member of the group consisting of H, alkyl and aryl; and wherein $n$ is an integer from 1 to 4.

7. A process for preparing poly-2-pyrrolidone which comprises polymerizing 2-pyrrolidone under substantially anhydrous conditions in the presence of a minor amount of an alkali metal salt of 2-pyrrolidone as catalyst and a small promoting amount of a compound selected from the group consisting of (N-alkyl carbamyl)-2-pyrrolidone and (N-aryl carbamyl)-2-pyrrolidone as activator for the polymerization and allowing the 2-pyrrolidone to polymerize to a solid polymer.

References Cited in the file of this patent
UNITED STATES PATENTS 2,739,959   Ney et al. _____ Mar. 27, 1956
2,809,958   Barnes et al. _____ Oct. 15, 1957

FOREIGN PATENTS 218,129   Australia _____ Nov. 3, 1958

OTHER REFERENCES

Australian Abstracts, No. 29,548/57, January 16, 1958.
Ser. No. 323,512, Hagedorn (A.P.C.), published Apr. 20, 1943.